United States Patent
Johnson

[15] 3,651,836
[45] Mar. 28, 1972

[54] ELECTRONIC CONTROL CIRCUIT FOR A CONTAINER FILLING MACHINE

[72] Inventor: Lloyd D. Johnson, Davenport, Iowa
[73] Assignee: The Kartridge Pak Co., Davenport, Iowa
[22] Filed: Oct. 21, 1970
[21] Appl. No.: 82,623

[52] U.S. Cl. ............................. 141/103, 141/160, 141/189
[51] Int. Cl. ........................................................ B65b 57/06
[58] Field of Search ............................. 141/100, 102–104, 141/156, 159, 157, 160, 167, 183, 186, 188, 189

[56] References Cited

UNITED STATES PATENTS

| | | | |
|---|---|---|---|
| 3,352,458 | 11/1967 | Cramer | 141/160 X |
| 3,402,523 | 9/1968 | Mojonnier | 141/102 X |
| 3,415,294 | 12/1968 | Kelly | 141/156 X |

*Primary Examiner*—Edward J. Earls
*Attorney*—Greist, Lockwood, Greenawalt & Dewey

[57] ABSTRACT

Two limit switches, one for sensing the presence of a container at a first filling station of a filling machine and one for sensing when the container has been advanced a predetermined distance through the filling machine, provide the only sensing means for controlling the filling of each container with equal amounts of fluid at four filling stations. The switches are connected to a shift register circuit which is actuated by the actuation of the switches to generate an output signal (or signals) on different leads to cause filling of the container at the first filling station and at subsequent stations each time the container is advanced a predetermined distance. A timer controls the filling at each station.

16 Claims, 7 Drawing Figures

PATENTED MAR 28 1972
3,651,836
SHEET 1 OF 4
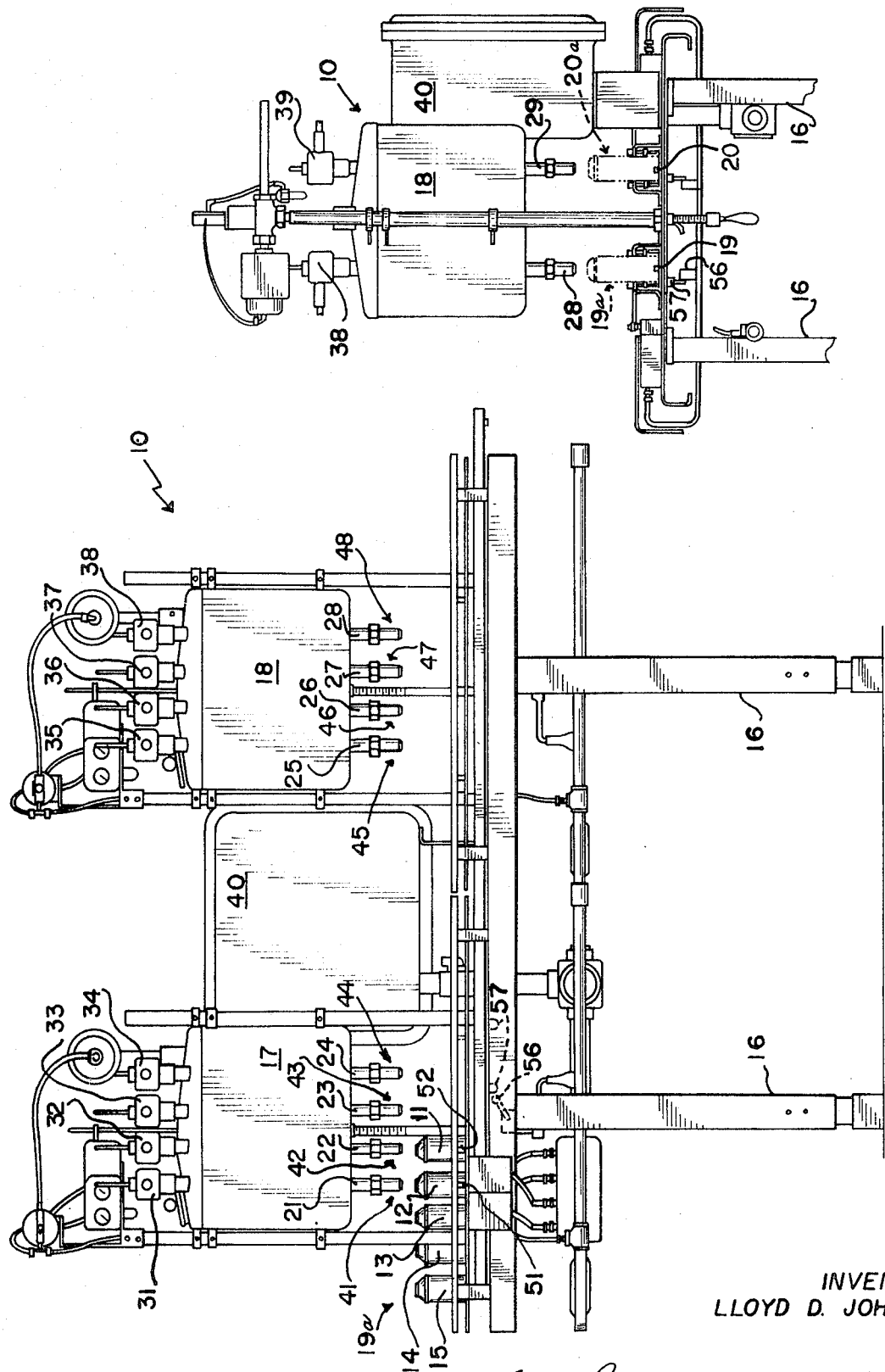
INVENTOR
LLOYD D. JOHNSON
ATT'YS

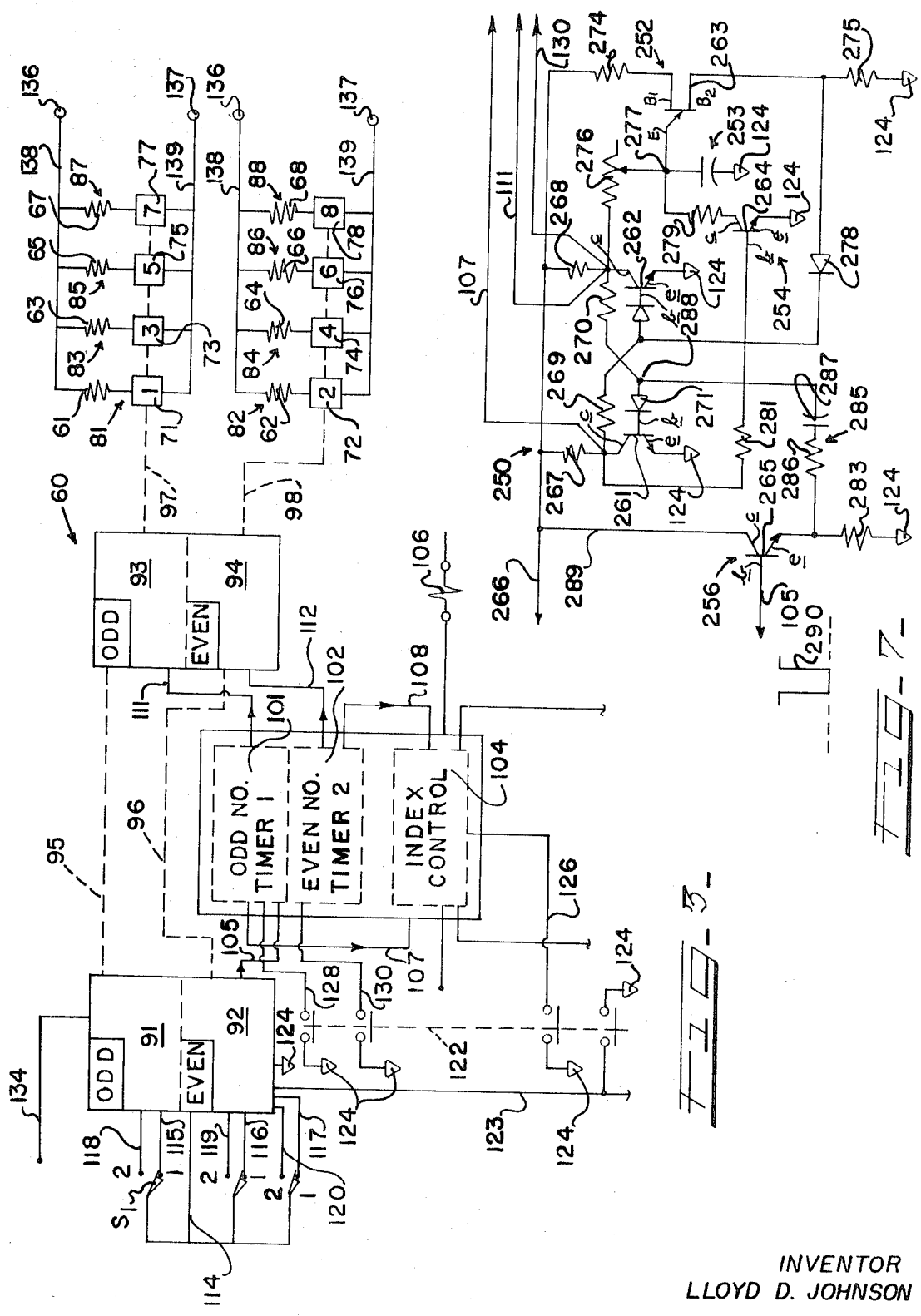

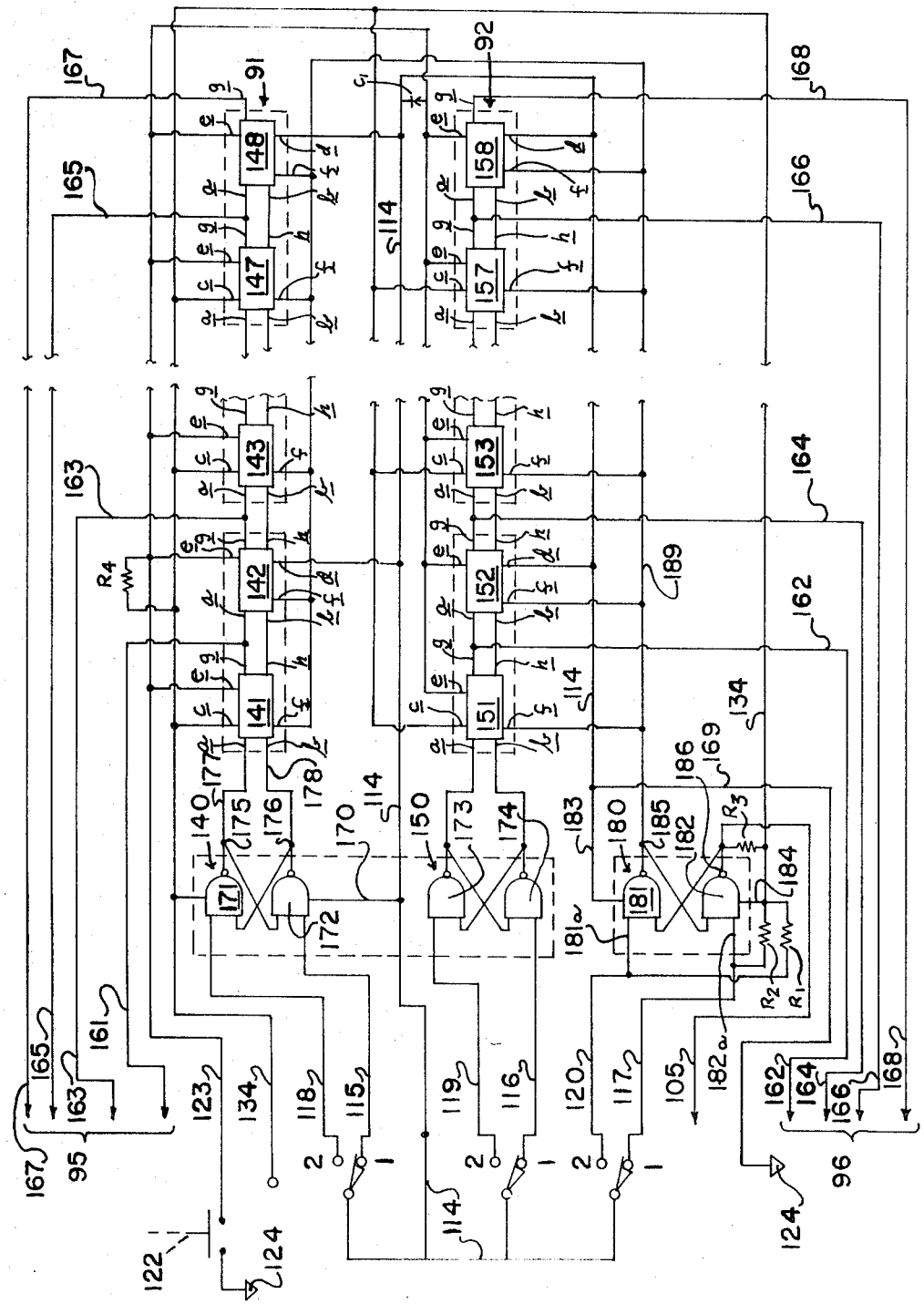

INVENTOR
LLOYD D. JOHNSON

ELECTRONIC CONTROL CIRCUIT FOR A CONTAINER FILLING MACHINE

The present invention relates to improvements and innovations in an electrical control circuit for a container filling machine. More specifically, the present invention relates to an electronic control circuit for accurately filling each container at each filling station of the machine with a predetermined amount of fluid upon sensing the container at the first filling station and upon sensing advancements of the container to succeeding filling stations, without sensing the container at each succeeding filling station as the container is advanced through the machine.

Heretofore, container filling machines such as machines for filling aerosol containers, have utilized individual, solenoid controlled, metering and dispensing devices at each filling station of the machine to fill each container, of a line of containers carried through the machine, with a predetermined amount of fluid at each station. The predetermined amounts of fluid constituted equal fractional portions of the capacity of the container. Typically, a container would be one fourth (¼) filled at each one of four filling stations and a sensing device such as a limit switch would be provided at each filling station to sense the presence of the container at the filling station and to cause actuation of the solenoid controlled metering device located at that station for dispensing the predetermined amount of fluid, equal to one fourth (¼) of the capacity of the container, into the container. Typically, the electrical control circuit for the machine included an individual timing device or circuit for each solenoid controlled metering device. Moreover, since actuation of any limit switch at any one of the filling stations would cause fluid to be dispensed from a nozzle at that filling station, some of the presently known filling machines do not permit the advancing of the containers a distance greater than the distance between adjacent filling stations. In this respect, if a container is advanced from the first station to the third station in some of the known filling machines, the limit switch at the intermediate second station will be momentarily engaged and this will cause fluid to be dispensed at the second filling station, while the containers are still moving, with resulting loss of fluid and incomplete filling of the containers.

It is to be noted, of course, that each time a container is advanced the distance between filling stations it is also indexed with respect to a nozzle at the next filling station. This advancing and indexing of a container is often simply referred to as indexing. Accordingly, hereinafter, movement of a container the distance between two stations will be referred to as single indexing and movement of a container the distance between three filling stations will be referred to as double indexing.

In view of the above noted deficiencies of presently known container filling machines, a primary object of the present invention is to provide an electronic control circuit for accurately controlling the dispensing of fluid into containers at a plurality of filling stations in a container filling machine in such a way that each container is filled at each filling station with a predetermined amount of fluid.

Another object of the invention is to provide an electronic control circuit for controlling the filling of a container at every other station in a line of filling stations within a container filling machine.

Another object of the present invention is to provide in a container filling machine, an electronic control circuit which utilizes a single container sensing device, located at the first filling station in a line of filling stations within the machine, and a device for sensing advancements of the containers a predetermined distance for controlling sequential filling of each container with a predetermined amount of fluid at each filling station.

Another object of the present invention is to provide an electronic control circuit for a container filling machine wherein the electronic control circuit allows each container to be advanced to, and indexed with respect to, the fluid dispensing nozzle at alternate filling stations.

Another object of the present invention is to provide an electronic control circuit which controls the filling of containers in a container filling machine and which permits double indexing of the containers without loss of fluid.

Another object of the present invention is to provide an electronic control circuit for a container filling machine in which the speed of container handling is increased by simultaneously filling a plurality of containers with equal, predetermined amounts of fluid.

Another object of the present invention is to provide in a container filling machine, an electronic control circuit which can be adapted for operating the container filling machine to fill two non-compatible products into a container, with the products being blended within the container.

Another object of the present invention is to provide in a container filling machine utilizing two supply bowls, an electronic control circuit which permits filling of containers from one supply bowl with single or double indexing of the containers, while the other supply bowl is being cleaned for a short filling run of hard to clean-up material, and thereby provide fast changeover.

Another object of the present invention is to provide in a container filling machine, an electronic control circuit which permits the time between each partial filling of each container at each filling station to be varied by filling each container with predetermined amounts of fluid at alternate filling stations and, in this way, obtain more accurate filling of foamy materials into the containers.

Another object of the present invention is to provide in an electronic control circuit for a container filling machine, a timer circuit which accurately repeats a timed signal for controlling the operation of fluid dispensing devices in the machine in such a way that the same amount of fluid is dispensed each time each device is operated.

Another object of the present invention is to provide in an electronic control circuit for a container filling machine, a timer circuit which is compact, flexible, versatile, and relatively inexpensive.

Still another object is to provide a relatively simple, compact, relatively inexpensive, reliable, flexible, and easily maintained electronic control circuit for a container filling machine.

To achieve the above objects, to overcome the above noted inadequacies in presently known container filling machines, and to provide a flexible, compact and accurate means for controlling the filling of containers at each filling station in a container filling machine, the present invention provides an electronic control circuit for controlling the filling of a series of containers at a number of filling stations located along a container line through a container filling machine with each container being filled with a predetermined amount of fluid at selected filling stations with single indexing or double indexing. The electronic control circuit of the present invention also dispenses with the need for container sensing means at each filling station and, for single indexing, utilizes only one container sensing means, in the form of a limit switch, at the first filling station and a sensing means, e.g., a limit switch, to sense the advancement of a carrier, on which the containers are carried, a predetermined distance equal to the distance between two selected filling stations. The simultaneous sensing of (a) the presence of a container at the first filling station, and (b) the advancement of the containers the predetermined distance, is utilized by the electronic control circuit to apply a control signal to a first signal channel for causing operation of a metering device at the first filling station to meter the predetermined amount of fluid through a nozzle into the container at the first filling station. Then, each time an advancement of the containers the predetermined distance is sensed, the electronic control circuit will shift the control signal, established by the simultaneous sensing of (a) the first container at the first filling station and (b) the previous advancement of the carrier, to another signal channel to cause sequential and individual actuation of each succeeding metering device at each succeeding filling station until the container is filled to capacity. In this respect it is to be understood that each filling station will fill the container with a predetermined fractional portion of the desired capacity of the container.

In one preferred embodiment of the electronic control circuit of the present invention, a unique timer circuit, including a flip-flop circuit which controls charging of a capacitor, a unijunction transistor which is fired by the voltage developed on the capacitor, and a capacitor shunting circuit, is utilized to ensure accurate timing of, and accurate repeatability of, a timed signal which is applied to a switching circuit of the electronic control circuit for actuating solenoid operated metering devices which control the flow of fluid through each nozzle at each filling station and thereby accurately control the time period during which fluid is metered through each nozzle into the container at each filling station.

Also in one preferred embodiment of the electronic control circuit of the present invention, an index control circuit is utilized for controlling the operation of a mechanism for advancing the containers, for preventing advancement of the containers while fluid is being dispensed from a nozzle at any one of the filling stations and for allowing the advancing mechanism to operate only when all timed signals have terminated.

The exact manner in which the present invention achieves its objects, and other objects and advantages inherent therein, will become more apparent from the following detailed description of a preferred embodiment of the invention taken in conjunction with the accompanying drawings wherein:

FIG. 1 is an end elevational view of a container filling machine incorporating the electronic control circuit of the present invention;

FIG. 2 is a side elevational view of the container filling machine shown in FIG. 1;

FIG. 3 is a schematic block diagram of the electronic control circuit of the present invention;

FIG. 4 is a schematic diagram with portions broken away, of the shift register circuits shown in block form in FIG. 3;

Figure 6:
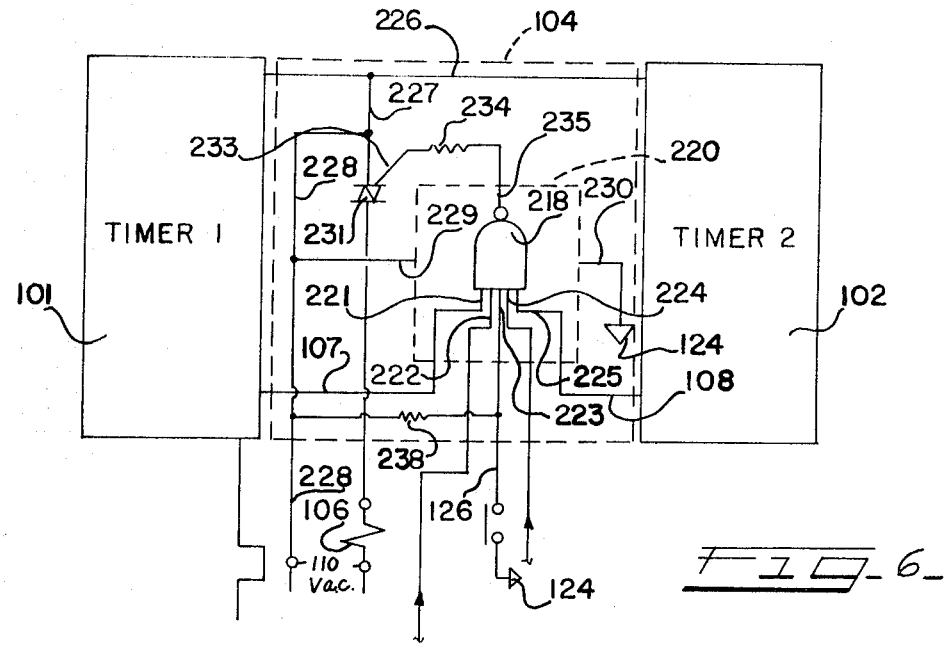
FIG. 6 is a schematic diagram of the logic switching circuits shown in block form in FIG. 3, for controlling solenoid operated metering devices; and, FIG. 7 is a schematic diagram of the unique timer circuit of the electronic control circuit of the present invention.

Referring now to the drawings in greater detail, a container filling machine is generally indicated at 10 in FIGS. 1 and 2. The machine 10 is particularly adapted for filling aerosol cans, five of which are indicated at 11–15 in FIG. 2.

As shown, the machine 10 includes a framework 16 supporting two fluid supply bowls 17 and 18 over two container carriers 19 and 20. It is to be understood that each carrier 19 and 20 carries a line of cans 19a, 20a through the filling machine, cans 11–15 being in the first line 19a, and that each carrier 19, 20 is intermittently advanced through the machine 10 by a suitable advancing mechanism (not shown) of known type.

As best shown in FIG. 2, a first group of nozzles 21–24 are mounted to the first fluid supply bowl 17 and extend downwardly over the carrier 19. In like manner, a second group of nozzles 25–28 are mounted to the second fluid supply bowl 18 and also extend downwardly over the carrier 19. Similar nozzles extend from the bowls 17 and 18 over the carrier 20 and are generally indicated at 29 in FIG. 2. Fluid flow through each of the nozzles 21–28 is controlled by solenoid operated metering devices generally indicated at 31–38. Similar metering devices for the nozzles 29 are generally indicated at 39 in FIG. 1.

Accurate metering of predetermined amounts of fluid into the cans, such as cans 11–15, is obtained by maintaining a constant level of fluid in each bowl 17 and 18 in a known manner, such as disclosed in Mojonnier U.S. Reissue Pat. No. 23,830, issued on May 18, 1954, and by accurately controlling the time period each metering device 31–38 is operated for allowing fluid to flow through each nozzle 21–28. One preferred timing circuit for obtaining such accurate control will be described in detail in connection with the description of FIG. 7.

In the illustrated embodiment, the bowls 17 and 18 are spaced from one another a predetermined distance which is equivalent to the space which would be taken up by eight additional nozzles equally spaced apart. With this spacing and with single indexing, it will require nine indexings (carrier advancements) to move a can from a position under nozzle 24 to a position under nozzle 25. Although the bowls 17 and 18 could be spaced closer together, the illustrated arrangement is preferred since it facilitates separate cleaning of each bowl 17, 18 and provides a space for mounting a control box 40 between the bowls 17 and 18 above, and to one side of, the carriers 19 and 20. Most of the components of the electronic control circuit of the present invention are mounted in the control box 40.

It will be understood that each of the nozzles 21–28 defines a filling station and these stations are generally identified by the reference numerals 41–48. Since the filling of the cans in the second line 20a on the carrier 20 from the nozzles 29 is the same as the filling of the cans in the first line 19a on the carrier 19 from the nozzles 21–28, only the filling of the cans in the first line 19a at the filling stations 41–48 will be described in detail.

It will be understood that as the cans 11–15 are carried by the carrier 19 through the filling machine 10, they are filled with fluid. In the illustrated embodiment and with double indexing, the can 11 and subsequent odd numbered cans are each one fourth (¼) filled from each of the nozzles 22, 24, 26 and 28 and the can 12 and subsequent even numbered cans are each one fourth (¼) filled from each of the nozzles 21, 23, 25 and 27. As will be described in detail in connection with the description of FIGS. 3–7, the electronic control circuit of the present invention is actuated to cause operation of the metering device 31 at the first filling station 41 when the presence of the can 12 is sensed at the first filling station 41 at the same time an advancement of the carrier 19 is sensed.

With respect to advancements of the carrier 19, it will be understood that the advancing mechanism (not shown) can be set for intermittently advancing the carrier a predetermined distance, such as, for example, a first predetermined distance equal to the center to center distance between the nozzles 21 and 22, hereinafter referred to as a single indexing of the carrier 19, or a second predetermined distance equal to the center to center distance between the nozzles 21 and 23, hereinafter referred to as a double indexing of the carrier 19.

In the illustrated embodiment, the advancing mechanism is set for double indexing of the carrier 19 and FIG. 2 shows the leading two cans 11 and 12 just after they have been double indexed with respect to the first and second nozzles 21 and 22 at the first and second filling stations 41 and 42.

The electronic control circuit of the present invention includes a first can sensing device 51, in the form of a limit switch, located at the first station 41, and for double indexing, a second can sensing device 52, also in the form of a limit switch, located at the second station 42. It also includes a carrier advancement sensing device, which, in the illustrated embodiment, is mounted on the framework 16, is generally included by the reference numeral 56 in FIGS. 1 and 2, and is preferably a limit switch, hereinafter referred to as the index limit switch 56. (If desired, however, the carrier advancement sensing device can be associated with the advancing mechanism.) In the illustrated embodiment, the carrier 19 has spaced apart cams 57 which are arranged in such a manner that each one of the cams momentarily engages the index limit switch 56 as the cam 57 passes the index limit switch 56. In this respect it will be understood that the cams 57 are spaced apart a distance equal to the center to center distance between the first and third nozzles 21 and 23 for sensing each double indexing.

When the cam sensing device 52 is sensing the presence of the can 11 at the second filling station 42 at the same time that the index limit switch 56 is engaged, the electronic control circuit of the present invention is operated to cause operation of the metering device 32 which opens, and maintains open, the nozzle 22 for a predetermined period of time so that a predetermined amount of fluid, equal to one fourth (¼) the desired capacity of each can, is allowed to flow (is metered) from the nozzle 22 into the can 11. As will be more fully explained in connection with the description of FIGS. 3–7, once a can has been one fourth (¼) filled at the first filling station 42, the electronic control circuit of the present invention will cause sequential operation of the succeeding even numbered metering devices 34, 36 and 38 each time the index limit switch 56 is engaged by one of the cans 57 upon an advancement of the carrier 19 a distance corresponding to a double indexing. In this way, the can 11 will be filled with equal amounts of fluid from the nozzles 22, 24, 26 and 28 as the carrier 19 is advanced through the filling machine 10, and, in like manner, the can 12 will be filled with equal amounts of fluid from the nozzles 21, 23, 25 and 27 at the carrier 19 is moved through the filling machine 10 as a result of the can 12 being sensed by the sensing device 51 at the first filling station 41 at the same time that the index limit switch 56 is momentarily engaged by one of the cams 57. The exact manner in which the electronic control circuit of the present invention causes the sequential operation of the metering devices 31–38 will now be explained in detail with reference to FIGS. 3–7.

The electronic control circuit of the present invention is generally indicated at 60 in the schematic diagram shown in FIG. 3. In the diagram, the solenoids for operating the metering devices 31–38 are indicated schematically at 61–68. As shown, each one of the solenoids 61–68 is connected in series with an electronic switch 71–78, each of which, as shown in FIG. 6, is preferably a triac having a sufficient current rating for controlling the current flow required to operate the solenoids 61–68. Each of the series connected solenoids 61–68 and electronic switches 71–78 constitutes an electric control means for individually controlling each of the metering devices 31–38 and these electric control means are generally identified by the reference numerals 81–88. The electronic control circuit 60 controls the sequential operation of each of these electric control means 81–88.

As shown, the electronic control circuit 60 includes first and second shift register circuits 91 and 92 each of which has a plurality of connections between logic switching circuits 93 and 94. The plural connections between the shift register circuit 91 and the logic switching circuits 93 are indicated by the broken line 95 and the plural connections between the shift register circuit 92 and the logic switching circuits 94 are indicated by the broken line 96. The logic switching circuits 93 are connected to the odd numbered electric control means 81, 83, 85 and 87 as indicated by the broken line 97 and the logic switching circuits 94 are connected to the even numbered electric control means 82, 84, 86 and 88 as indicated by the broken line 98.

The electronic control circuit 60 also includes an odd numbered timer circuit 101 and an even numbered timer circuit 102, as well as an index control circuit 104. The shift register circuits 91 and 92 are connected by a lead 105 to the timer circuits 101 and 102 for applying a trigger signal to the timer circuits 101 and 102. As will be hereinafter more fully described in connection with the description of FIG. 7, the timer circuits 101 and 102 control the time periods during which each of the electric control means 81–88 is energized for controlling the period of operation of each one of the metering devices 31–38.

The index control circuit 104 controls energization of a solenoid 106, which controls the operation of the advancing mechanism and will be hereinafter more fully described in connection with the description of FIG. 6. In this respect, the solenoid 106 is energized to prevent advancement of the carrier 19 by the advancing mechanism so long as either one of the timer circuits 101 or 102 is sending a timed signal via lead 111 or 112 to the logic switching circuits 93 or 94. (If desired, however, the index control circuit 104 can be modified so that the solenoid 106 prevents the advancement of the carrier 19 when the solenoid 106 is deenergized.)

As shown in FIG. 3, the limit switches 51 and 52 are single pole double throw limit switches which are adapted for movement between two positions 1 and 2 and which are normally at position 1. The index limit switch 56 is also a single pole double throw limit switch which is adapted for movement between two positions 1 and 2 and which is normally at position 1. As shown, in the first position each of the limit switches 51, 52 and 56 connects a common lead 114 to a lead 115, 116, or 117, respectively, from the shift register circuits 91 and 92.

When the limit switch 51 is engaged by a can, it is moved to the second position where it connects the common lead 114 to a lead 118 from the shift register circuit 91. When the limit switch 52 is engaged by a can, it is moved to the second position where it connects the common lead 114 to a lead 119 from the shift register circuit 92. And, when the index limit switch 56 is momentarily engaged by one of the cams 57, it is moved to the second position where it connects the common lead 114 to a lead 120 from the shift register circuits 91 and 92.

The electronic control circuit 60 further includes several switches for stopping or interrupting various function of the electronic control circuit 60. In the illustrated embodiment, these switches are combined into a four pole single throw switch indicated schematically by a broken line 122. As will become apparent from the following description, the switch 122 is adapted to:

1. Cancel any signals in the shift register circuits 91 and 92 by connecting a lead 123 from the shift register circuits 91 and 92 to a common conductor 124;

2. Stop advancement of the advancing mechanism by connecting a lead 126 from the index control circuit 104 to the common conductor 124;

3. Terminate any timed signal from the timer circuit 101 by connecting a lead 128 from the timer circuit 101 to the common conductor 124; and, 4. Terminate any timed signal from the timer circuit 102 by connecting a lead 130 from the timer circuit 102 to the common conductor 124.

Although not shown, it is to be understood that the electronic control circuit 60 is supplied with operating potential from a suitable power supply of known type. In one preferred embodiment of the invention, the electronic control circuit 60 is operated on twelve (12) volts DC which is applied to a common positive conductor 134. Also, the electric control means 81–88 are supplied with 110 volts AC from a conventional source, which is applied to terminals 136, 137 connected respectively to conductors 138 and 139.

The shift register circuits 91 and 92 are shown in detail in FIG. 4, and it will be noted that the shift register circuit 92 is essentially the same as the shift register circuit 91. In this respect, the shift register circuit 91 includes an input buffer circuit 140 and eight flip-flop stages, five of which are shown at 141, 142, 143, 147 and 148 and the shift register circuit 92 includes a similar input buffer circuit 150 and similar flip-flop stages, five of which are shown at 151, 152, 153, 157 and 158. The logic output signals from the stages 141, 142, 147 and 148 and the stages 151, 152, 157 and 158 are applied to the logic switching circuits 93, 94 via leads 161–168. In this respect, it is to be noted that the leads 161, 163, 165 and 167 constitute the plurality of leads indicated by the broken line 95 in FIG. 3 and that the leads 162, 164, 166 and 168 constitute the plurality of leads indicated by the broken line 96 in FIG. 3.

The buffer circuits 140 and 150 can be of known type, and can be included in one integrated circuit such as the Type 302 CJ Quad-Two Input Buffer integrated circuit sold by the Amelco Semiconductor Division of Teledyne, Inc., Los Angeles, California. Also, the stages 141–148 and 151–158 of the shift register circuits 91 and 92 can be of known type, such as Type 312 Dual JK Flip-Flop integrated circuits also sold by the Amelco Semiconductor Division of Teledyne, Inc. As indicated by phantom lines, two flip-flop stages are contained in each integrated circuit.

The common lead 114 is connected to the common conductor 124 via a lead 169 and the buffer circuits 140 and 150 are connected to the common lead 114 via the lead 170. As shown, the buffer circuit 140 includes two NAND circuits 171 and 172 and the buffer circuit 150 includes two NAND circuits 173 and 174. As shown, the lead 115 is connected to one input terminal of the NAND circuit 172 and the lead 118 is connected to one input terminal of the NAND circuit 171. The NAND circuits 171 and 172 are interconnected so that with the limit switch 51 in the first position where it connects lead 114 to lead 115, as shown, the logic output signal at terminal 175 of the NAND circuit 171 will be logic zero and the logic output signal at terminal 176 of the NAND circuit 172 will be at some positive value hereinafter referred to as logic one. Then, when switch 51 is moved to its second position to connect the common lead 114 to the lead 118, the logic output at the terminal 176 will be reduced to logic zero and the logic output at terminal 175 will be increased to logic one. It will be noted that the terminals 175 and 176 are connected via leads 177 and 178 to input terminals 141$a$, 141$b$, respectively of the first stage 141 of the shift register circuit 91.

The positive operating voltage of twelve (12) volts DC is applied via the common positive conductor or bus 134 to the $c$ input terminal of one of the stages 141–148 and 151–158 contained in each integrated circuit utilized in the shift register circuits 91 and 92. Also the common lead 114 is connected to the $d$ input terminal of one of the stages 141–148, 151–158 contained in each integrated circuit utilized in the shift register circuits 91 and 92. The lead 123 is connected to the $e$ terminal of each stage 141–148 and 151–158 so that, when the switch 122 is closed to connect the lead 123 to the common conductor 124, a logic zero signal is applied to each $e$ terminal to cancel any logic one signal applied to the leads 161–168.

The leads 117 and 120 connected to the first and second contacts of the limit switch 56 are connected to a buffer circuit 180 similar to the buffer circuits 140 and 150. In this respect, the buffer circuit 180 includes a first NAND circuit 181 and a second NAND circuit 182 which are interconnected as shown. The lead 117 is connected to input terminal 181$a$ of the NAND circuit 181 and the lead 120 is connected to input terminal 182$a$ of the NAND circuit 182. The buffer circuit 180 is connected by a lead 183 to the common lead 114 and by a lead 184 to the positive conductor 134. The buffer circuit 180 has two output terminals 185 and 186, the terminal 185 being an output terminal of the first NAND circuit 181 and the terminal 186 being an output terminal of the second NAND circuit 182. As shown, a first resistor $R_1$ is connected between the lead 120 and the common positive conductor 134, a second resistor $R_2$ is connected between the lead 117 and the common positive conductor 134, and a third resistor $R_3$ is connected between the output terminal 186 and the common positive conductor 134. The resistors $R_1$ and $R_2$ attenuate extraneous signals, e.g., "line noise" and prevent the same from causing a premature operation of the buffer circuit 180. The resistor $R_3$ ensures a definite change of the output signal at terminal 186 from logic one to logic zero and then back to logic one upon actuation of the index limit switch 56. The output terminal 186 is also connected to the lead 105 leading to the timer circuits 101 and 102 and the output terminal 185 is connected via a lead 189 to input terminals 141$f$–148$f$ and 151$f$–158$f$ of the stages 141–148 and 151–158.

When the index limit switch 56 is in its first position where it connects the common lead 114 to the lead 117, the logic output signal at output terminal 185 is logic zero and the logic output signal at the output terminal 186 is logic one. Then, when the index limit switch 56 is moved to its second position where it connects the common lead 114 to the lead 120 the logic output signal at the output terminal 185 is increased to logic one and the logic output signal at the output terminal 186 is reduced to logic zero. This change in the logic output signals at the output terminals 185 and 186 will only be for a short duration since the index limit switch 56 is only held in its second position for a very short period of time as one of the cams 57 engages and passes by the index limit switch 56.

It is to be understood that the buffer circuits 140, 150, and 180 isolate the stages 141–148 and 151–158 from the movement of the limit switches 51, 52 and 56. Primarily, the buffer circuits 140, 150 and 180 prevent erratic operation of the shift register circuits 91 and 92 which otherwise might be incurred by bounce of the limit switches 51, 52 and 56. Moreover, since the index limit switch 56 is moved to its second position for only a short period of time, the biasing resistors $R_1$, $R_2$ and $R_3$ further ensure against erratic operation of the buffer circuit 180 as the index limit switch 56 is moved from its first position to its second position and then back to its first position. That is to say, when the index limit switch 56 is moved to its second position, the logic zero input signal on lead 117 to the second NAND circuit 182 will be immediately changed to a positive or logic one signal as a result of the voltage on lead 134 being applied through resistor $R_2$ to the input terminal 182$a$ of the second NAND circuit 182 and the signal at the input terminal 181$a$ of the first NAND circuit 181 is immediately reduced to logic zero as a result of the voltage drop across resistor $R_2$ which is then connected between the common positive lead 134 and the common lead 114 momentarily connected to the lead 117.

Preferably, a resistor $R_4$ is connected between lead 123 and the positive conductor 134 to ensure immediate application of a logic zero signal to lead 123 by reason of the voltage drop across $R_4$ when the switch 122 is closed, and a capacitor $C_1$ is connected between lead 123 and the common conductor 124 to provide an AC shunting circuit for any extraneous signals which may be picked up on the lead 123 and to provide for initial application of a logic zero signal to lead 123 when the electronic circuit is first energized.

The operation of the shift register circuits 91 and 92 will now be described with reference to FIGS. 2, 3 and 4.

When the first line 19$a$ (FIG. 2) of cans on the carrier 19 are double indexed to move the second can 12 into position under the first nozzle 21 at the first filling station 41, the limit switch 51 is moved to its second position by the can 12 and will remain there so long as the can 12 is at the first filling station 41. After the limit switch 51 is moved to its second position as the can 12 is moved to the first filling station 41, and before movement of the carrier 19 is stopped, the index limit switch 56 is actuated. In its second position, the limit switch 51 causes a logic one output signal to be applied to the lead 177 and a logic zero output signal to be applied to the lead 178, such that a logic one signal is now applied to the input terminal 141$a$ of the first stage 141 and a logic zero signal is applied to the input terminal 141$b$ of the first stage 141. Movement of the index limit switch 56 to its second position and then back to its first position generates a signal which is applied via the lead 189 to the input terminal 141$f$ of the first stage 141 to cause the logic one signal at terminal 141$a$ to be shifted to an output terminal 141$g$ of the first stage 141. This logic one output signal is now applied to lead 161 connected between the output terminal 141$g$ and one of the logic switching circuits 93. The logic zero signal at the 141$b$ terminal is also shifted to an output terminal 141$h$ and, as shown, the output terminals 141$g$ and 141$h$ of the first stage 141 are connected to the input terminals 142$a$ and 142$b$, respectively, of the second stage 142. In like manner, the $g$ and $h$ output terminals of each succeeding stage 142–147, are connected to the $a$ and $b$ terminals, respectively, of the next stage 143–148.

At the same time the logic signals are shifted across the first stage 141, the movement of the index limit switch 56 from its first position to its second position and back to its first position will result in a change of the logic output signal at the terminal 186 from logic one to logic zero and back to logic one. As will be more fully explained in connection with the description of FIG. 7, the leading edge of the signal pulse on lead 106 (which is generated by the movement of the index limit switch from its second position back to its first position) will trigger the first timer circuit 101 to send a timed logic one signal via lead 111 to the logic switching circuits 93.

As will be more fully explained in connection with the description of FIG. 5, when the logic switching circuit (of the circuits 93) which controls the operation of the triac 71 receives logic one signals from leads 161 and 111, it will "fire" the triac 71 to energize the solenoid 61 to operate the first metering device 31 to meter a predetermined amount of fluid through the nozzle 21 into the can 12. The metering period is controlled by the time period of the timed signal applied to the lead 111 and, when this timed signal is terminated, the triac 71 is "turned off" (rendered nonconducting) to deenergize the solenoid 61 and stop operation of the metering device 31.

In a similar manner, the can 11 is filled with a predetermined amount of fluid from the nozzle 22 as a result of the limit switch 52 being in its second position when the index limit switch 56 is actuated. In this respect, movement of the limit switch 52 to its second position changes the logic input at the terminals 151a and 151b of the first stage 151 from logic zero, logic one to logic one, logic zero. Then, when a logic one signal is applied via lead 189 to the terminal 151f the logic one signal at the input terminal 151a is shifted to the output terminal 151g to which the lead 162 is connected. A logic one signal is then applied via the lead 162 to the logic switching circuit (of the circuits 94) which controls the "firing" of the triac 72. At the same time, the second timer circuit 102 is actuated by the trigger signal or pulse on the lead 105 to send a timed signal via the lead 112 to the logic switching circuits 94. As a result, the triac 72 is "fired" to energize the solenoid 62 to operate the metering device 32 for metering a predetermined amount of fluid through the nozzle 22 into the can 11.

If the carrier 19 is being advanced only the first predetermined distance equal to the center to center distance between nozzles 21 and 22, i.e., a single indexing, then the index limit switch 56 will only be actuated on every other advancement or indexing. If this be the case, then, when the carrier 19 is advanced again and the can 12 is moved to the second filling station 42, the limit switch 52 will be moved to its second position, but the index limit switch 56 will not be actuated and no signal will be applied via the lead 189 to the terminal 151f or via the lead 105 to the timer circuits 101 and 102, and the metering device 32 at the second filling station 42 will not be operated.

However, on the next single indexing or, if there is a double indexing, the index limit switch 56 is actuated. A logic one output signal is then established at the terminal 185 and applied via the lead 189 to the terminals 141f-148f and 151f-158f of the stages 141-148 and 151-158, and any logic one signal at any one of the a terminals is shifted to the g terminal of any of the stages 141-148 and 151-158. Thus, the logic one signal at terminals 142a and 152a will be shifted respectively to terminals 142h and 152h and these logic one signals will be transmitted via leads 163 and 164 to particular circuits of the logic switching circuits 93 and 94. At the same time, timed logic one signals from the timer circuits 101 and 102 are applied via leads 111 and 112 to the logic switching circuits 93 and 94 to cause energization of the solenoids 63 and 64 for operating the metering devices 33 and 34 to fill each of the cans 11 and 12 with a predetermined amount of fluid though nozzles 24 and 23, respectively.

If there are succeeding cans on the carrier 19, such as the cans 13 and 14, each of the switches 51 and 52 will also have been moved to its second position when the index limit switch was actuated, and the metering devices 31 and 32 will again be actuated, in the manner described above, to fill the cans 13 and 14 with a predetermined amount of fluid through nozzles 22 and 21, respectively, at the same time cans 11 and 12 are receiving fluid from nozzles 24 and 23, respectively.

From the foregoing description, it will be understood that each time the index limit switch 56 is actuated to apply a signal via the lead 189 to the f terminal of each of the stages 141-148 and 151-158, the signal at the a terminal of each of these stages is shifted to the g terminal of each of these stages. However, in the illustrated embodiment, only some of these g output terminals are connected to the logic switching circuits 93, 94 via the leads 161-168 because of the space between the nozzles 24 and 25. In the shift register circuits 91 and 92, this space is compensated for by the stages 143-146 and 153-156.

Also from the foregoing description, it will be understood that the container filling machine 10 is particularly adapted for double index filling of cans as they are moved through the machine 10. In this respect the first two cans 11 and 12 will be one fourth (¼) filled at the first two stations 42 and 41. Then, the carrier 19 is double indexed and the cans 11 and 12 are again one fourth (¼) filled at the stations 44 and 43. After the fifth succeeding double indexing, the cans 11 and 12 will be again one fourth (¼) filled at the stations 46 and 45, and after the next double indexing, the cans 11 and 12 are again one fourth (¼) filled at the stations 48 and 47 to complete the filling of the cans 11 and 12. Of course any succeeding cans, e.g., cans 13-15, will be filled in the same manner. Also, the first (or second) metering device 31 (32) and succeeding odd (even) numbered metering devices 33, 35 and 37 (34, 36 and 38) will only be operated if a can is sensed by the can limit switch 51 (52) at the same time an advancement of the carrier 19 is sensed by the index limit switch 56.

Figure 5:
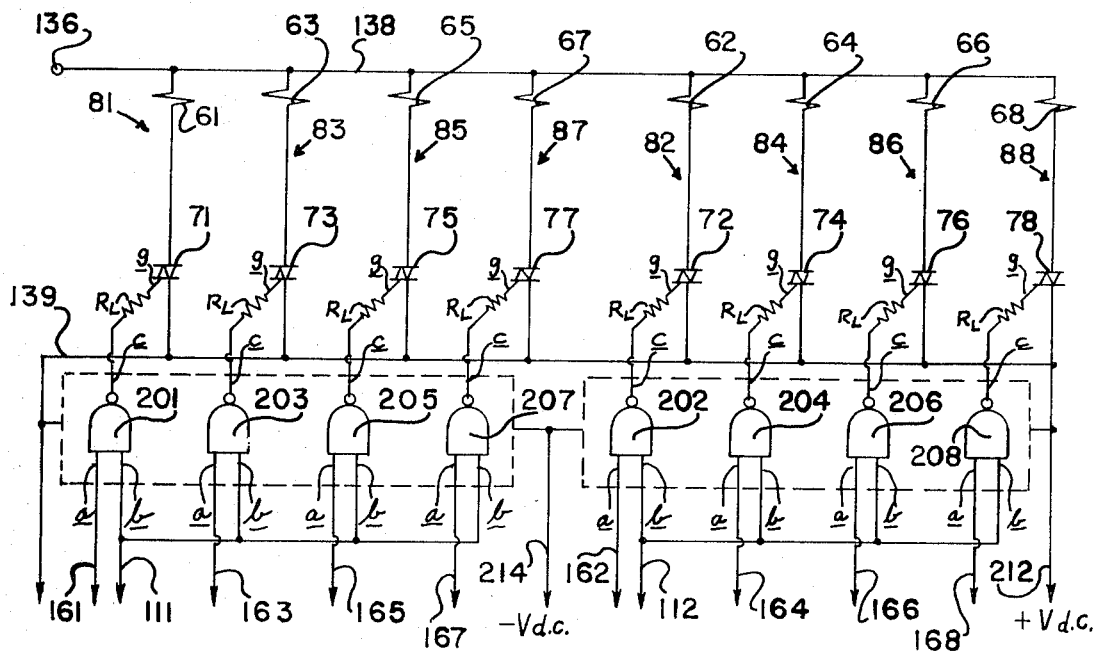
FIG. 5 is a schematic diagram of the index control circuit shown in block form in FIG. 3.

Referring now to FIG. 5, the logic switching circuits 93 and 94 include eight NAND circuits which are numbered 201-208 as indicated. These NAND circuits are of known type and in one preferred embodiment the NAND circuits 201-208 are contained in two Type 302 Quad-Two Input Buffer integrated circuits sold by the Amelco Semiconductor Division of Teledyne, Inc.

Each of the NAND circuits 201-208 has two input terminals a and b and one output terminal c. Each of the a terminals is connected to one of the leads 161-168. Each of the b terminals of the odd numbered NAND circuits 201-207 is connected to the lead 111 from the first timer circuit 101 and each of the b terminals of the even numbered NAND circuits 202-208 is connected to the lead 112 from the second timer circuit 102. The c terminal of each of the NAND circuits 201-208 is connected through a current limiting resistor $R_L$ to the gate g of one of the triacs 71-78. DC operating voltage is applied to the logic switching circuits 93 and 94 through leads 212 and 214.

When a timed logic one signal is applied from the first timer circuit 102 via lead 111 to the b terminal of the first NAND circuit 201 at the same time a logic one signal is applied via the lead 161 to the a terminal of the NAND circuit 201, a logic output signal will be established at the 201 c terminal and is applied through the current limiting resistor $R_L$ to the gate g of the triac 71 to "fire" or turn on the triac 71 to energize the solenoid 61 to operate the metering device 31. The triac 71 will be maintained in the turned on condition so long as logic one signals are applied to the a and b input terminals of the NAND circuit 201. Then, when the timed logic one signal applied to the b terminal via the lead 111 from the first timer circuit 101 is terminated, the logic one output signal at the c terminal is reduced to logic zero and the triac 71 is turned off to terminate the operation of the metering device 31.

It will be understood that the other odd numbered NAND circuits 203-207 of the logic switching circuits 93 are operated in a similar manner when logic one signals are applied to the a and b input terminals thereof to "fire" the triacs 73-77. The even numbered NAND circuits 202-208, constituting the logic switching circuits 94, are operated in a similar manner to "fire" the even numbered triacs 72-78 when a logic one signal is applied via one of the leads 162, 164, 166 and 168 to the a terminal of one of the even numbered NAND circuits 202-208 at the same time that a timed logic one signal is applied via the lead 112 from the second timer circuit 102 to the b terminals of the even numbered NAND circuits 202-208.

Referring now to FIG. 6, the index control circuit 104 includes a NAND circuit 218 which, in one preferred embodiment of the invention, is contained in a Type 301 Dual-Five Input Buffer integrated circuit sold by the Amelco Semiconductor Division of Teledyne, Inc. The integrated circuit is generally indicated by phantom lines at 220. The NAND circuit 218 has five input terminals 221–225. DC operating voltage is applied from a conductor 226 via leads 227, 228 to one input terminal 229 of the integrated circuit 220 and another terminal 230 of the integrated circuit 220 is connected to the common conductor 124. One line from a 110 volts AC source is also connected to lead 228 for energizing the index solenoid 106 which is connected in series with a triac 231 between the junction of the leads 227 and 228 and the other line from the 110 volts AC source. The gate 233 of the triac 231 is connected through a current limiting resistor 234 to an output terminal 235 of the NAND circuit 218. The NAND circuit 218 is designed so that when all of the input terminals 221–225 have a logic one thereon, a logic one output signal will be established at the output terminal 235 to "fire" the triac 231 into conduction so that the 110 volts AC will be applied to the solenoid 106 to move a solenoid armature (not shown) of known type to a position which permits operation of the advancing mechanism for advancing the carrier 19.

The terminal 221 is connected to lead 107 from the first timer circuit 101. The terminal 225 is connected to lead 108 from the second timer circuit 102. The terminal 223 is connected to the lead 126. A resistor 238 is connected between the terminal 223 and the lead 228 to ensure a logic zero signal on the terminal 223 when the switch 122 is closed. The terminals 222 and 224 are adapted for connection to first and second timer circuits for controlling the operation of the metering devices 39 for the second line 20a. When only the first line 19a is being fed into the machine 10, the terminals 222 and 224 have a logic one signal thereon.

A positive voltage constituting a logic one signal is applied through the resistor 238 to the terminal 223 when the switch 122 is open. Logic one signals will be applied to the terminals 221, 222, 224 and 225 from the four timer circuits for the two lines 19a and 20a only when none of the timer circuits is applying a timed signal to a logic switching circuit.

Thus, when any one of the timer circuits (e.g., timer circuits 101 or 102) is applying a timed signal (e.g., via lead 111 or 112), a logic zero signal is applied to one of the terminals 221, 222, 224 and 225. Also, a logic zero signal will be applied to terminal 223 when the switch 122 is closed. So long as any one of the input terminals 221–225 has a logic zero signal thereon advancement of the carrier 19 (and the carrier 20) is prevented.

Although the timer circuits 101 and 102 can be of known type, in a preferred embodiment of the electronic control circuit 60 of the present invention a novel timer circuit is utilized for each of the timer circuits 101 and 102. Since the preferred timer circuits 101 and 102 are identical, only the timer circuit 101 will be described in detail with reference to FIG. 7.

Referring now to FIG. 7, the timer circuit 101 includes a flip-flop circuit 250, a signal control circuit 252 including a timing capacitor 253 connected to the flip-flop circuit 250, a capacitor shunting circuit 254 connected to the capacitor 253, and an input buffer circuit 256 connected between the lead 105 and the flip-flop circuit 250.

The flip-flop circuit 250 includes first and second electronic switching elements 261 and 262 which, in the illustrated embodiment, are transistors. The signal control circuit 252 also includes a switching element in the form of a unijunction transistor 263. The shunting circuit 254 includes a switching element in the form of a transistor 264 and the buffer circuit 256 includes a switching element in the form of a transistor 265. DC voltage is supplied to the timer circuit 101 via lead 266.

As shown, the emitter $e$ of each of the transistors 261 and 262 is connected to the common conductor 124 and the collector $c$ of each of these transistors is connected through a load resistance 267, 268, to the positive lead 266. Conventional feedback resistors interconnecting the collector $c$ of one transistor 261, 262 with the base $b$ of the other transistor 262, 261 are indicated at 269, 270. A diode 271, 272 is connected between the base $b$ of each transistor 261, 262 and the feedback resistor 270, 269 to prevent negative pulses from being applied to the base $b$ of either of the transistors 261 and 262. As shown, the lead 111, which carries the timed output signal to the logic switching circuits 93 is connected to the collector $c$ of the transistor 262 and the lead 107, which connects the timer circuit 101 with the index control circuit 104, is connected to the collector $c$ of the transistor 26.

In addition to the unijunction transistor 263, the signal control circuit 252 includes two load resistors, 274 and 275, the resistor 275 being connected between the base $B_1$ of the unijunction transistor and the positive lead 266 and the load resistor 273 being connected between the base $B_2$ of the unijunction transistor 263 and the common conductor 124. The signal control circuit 252 also includes a variable resistor (potentiometer) 276 connected between the collector $c$ of the transistor 262 and a junction 277 connected to the emitter E of the unijunction transistor 252 and to one side of the capacitor 253, the other side of the capacitor 253 being connected to the common conductor 124. The junction between the base $B_2$ and the resistor 275 is connected through a diode 278 to the base $b$ of the transistor 262.

The capacitor shunting circuit 254 includes the transistor 264 and a load resistor 279 which is connected between the junction 277 and the collector $c$ of the transistor 264. The emitter $e$ of the transistor 254 is connected to the common conductor 124. A resistor 281 is connected between the collector $c$ of the transistor 261 of the flip-flop circuit 250 and the base $b$ of the transistor 254 of the shunting circuit 264.

The buffer circuit 256 includes the transistor 265 and a load resistor 283 which is connected between the emitter $e$ of the transistor 265 and the common conductor 124. A reactive AC coupling circuit 285 including a resistor 286 and a capacitor 287 is connected between the emitter $e$ of the transistor 265 and the junction 288 between the diode 271 and the resistor 270. Positive voltage for operating the transistor 265 is applied to the collector $c$ of the transistor 265 via lead 288 connected to the positive lead 266.

The operation of the timer circuit 101 will now be described as follows:

When the flip-flop circuit 250 is in its stable state, the second transistor 262 is conducting and the first transistor 261 is not conducting. In this stable state condition the potential at the collector $c$ of the transistor 262 is very low and can be considered at essentially zero potential. Thus, the signal on the lead 107 will be a logic zero signal. On the other hand, with the first transistor 261 nonconducting, the potential at the collector $c$ thereof is essentially equal to the DC operating voltage so that a logic one signal is on the lead 111. In this way, the output signal on the lead 111 to the logic switching circuits 93 will normally be logic zero and the output signal on the lead 107 to the index control circuit 104 will normally be a logic one signal. As previously explained, a positive voltage is normally on the input lead 105. As a result, the base $b$ of transistor 265 is forward biased and transistor 265 is normally conducting. Then, when the index limit switch 56 is moved from its first position to its second position, the signal on the lead 105 is changed to zero to shut off the transistor 265 in the buffer circuit 256. Although the current through the reactive circuit 285 may vary when current flow through the transistor 265 is stopped, the varying current flowing through the reactive circuit 285 to the common conductor 124 will only establish a negative voltage at the junction 288 and such negative voltage is blocked by the diode 271. However, when the limit switch 56 is moved from its second position to its first position and a positive signal is again established on the lead 105 connected to the base $b$ of the transistor 265, the transistor 265 is turned on and current starts to flow through the transistor 265 and the resistor 283. The current which then flows through the transistor 265 and the resistor 283 when the transistor 265 is initially turned on is a pulse and the positive going edge 290 of this pulse constitutes a varying current which is increasing very rapidly and has a very high frequency, i.e., a current spike. The current spike is passed by the capacitor 287 of the reactive circuit 285 and the diode 271 to the base $b$ of the transistor 261 to turn on the transistor 261. When this occurs the output signal on the lead 107 is changed from a logic one signal to a logic zero signal and is applied to the index control circuit 104 to prevent energization of the solenoid 106. Also, the transistor 262 is turned off, with the result that a logic one signal is now established at the collector $c$ of the transistor 262. The logic one signal on the collector $c$ of the transistor 262 constitutes the timed logic one signal applied to the lead 111. The time period of this signal is controlled by the signal control circuit 252.

The signal control circuit 252 provides a very precise control over the time period of the timed signal by utilizing a unijunction transistor 263 which has a very stable firing point. In this respect, the "firing" will only take place when the capacitor 253 (which is now charged through resistors 268 and 276) has charged to a voltage equal to the bias voltage between the emitter E and the base $B_2$ of the transistor 263. This charging time is determined by the resistance of resistors 268 and 276 which are connected in series with the capacitor 253, and the capacitance of the capacitor 253. Then current will flow through the emitter E and the base $B_2$ of the unijunction transistor 263. This current from the discharge of the capacitor 253 through the emitter E and the base $B_2$ of the unijunction transistor 263 will flow through the load resistor 275 to the common conductor 124 and will establish a positive potential at the junction between the base $B_2$ and the resistor 275 which is applied through the diodes 278 and 272 to the base $b$ of the transistor 262 to turn on the transistor 262 causing it to conduct. As soon as the transistor 262 conducts, the signal at the collector $c$ of the transistor 262 is reduced from logic one to logic zero and the logic one signal on the lead 111 is thereby terminated.

It is to be appreciated that loading of the collector $c$ of the transistor 262 can affect the timing. Therefore, the timed logic one output signal on the lead 111 connected to the collector $c$ of the transistor 262 is buffered. That is to say, the lead 111 is connected to a high impedance load, this high impedance load being provided in the NAND circuits 201, 203, 205 and 207 constituting the logic switching circuits 93.

When the second transistor 262 is rendered conducting, the transistor 261 is rendered nonconducting and the potential at the collector $c$ of the transistor 261 is raised from essentially 0 volts to essentially the operating voltage to again establish a logic one signal on the leads 107 and 239 to permit operation of the advancing mechanism. This potential at the collector $c$ of the transistor 261 is also applied through the resistor 281 to the base $b$ of the transistor 264 to turn on the transistor 264 causing it to conduct. When this occurs, the capacitor 253 is shunted to the common conductor 124 through the resistor 279 and the transistor 264 and any residual charge left on the capacitor 253 is dissipated. This shunting of the capacitor 253 ensures accurate repeatability of the time period of the logic one output signal on the lead 111 since the capacitor 253 will always be charged from 0 volts to the predetermined voltage ($V_{E-B}$) required to fire the unijunction transistor 263.

From the foregoing description, it will be understood that closing of the switch 122 will apply a logic zero signal via leads 128 and 130 to the collector $c$ of the transistor 262 in the timer circuits 101 and 102 to cancel any logic one signals on the leads 111 and 112.

In addition to (1) a stable firing point of the transistor 263 and (2) shunting of residual charge on the timing capacitor 253, repeat accuracy of the timer circuit 101 is also dependent upon (3) stability of the timing capacitor 253 and the variable timing resistor 276, and (4) the regulation of the DC power supply. With respect to (1) and (2) the timer circuit 101 provides a unijunction transistor 263, which has an inherently stable firing point through a wide temperature range, and provides the shunting circuit 254 for shunting any residual charge on the capacitor 253. As for (3) and (4), capacitors and variable resistors with more than adequate stability, and power supplies regulated to within 0.01 percent are readily available.

It is to be understood that certain modifications and variations can be made to the electronic control circuit 60 of the present invention without departing from the scope of the invention. In this respect the shift register logic circuit connections can be modified, and the cams 57 can be arranged on the carrier 19 to actuate the index limit switch 56 upon each single indexing. In this way, the index limit switch 52 can be disconnected and the cans 11–15 and subsequent cans can be completely filled from only the first bowl 17 with each can 11–15 and subsequent cans being one fourth (¼) filled from each of the nozzles 21–24 or from both bowls 17 and 18 with each can 11–15 and subsequent cans being one eighth (⅛) filled from each of the nozzles 21–28. For filling cans from only the first bowl 17, one also can change the timed period during which the nozzles 21–24 are dispensing fluid by adjusting the variable resistor 276 in the timer circuit 101, instead of modifying circuit connections, so that, with single or double indexing, each can will be one half (½) filled from nozzles 21 and 23 or nozzles 22 and 24.

Furthermore, the leads 111 and 112 from the timer circuits 101 and 102 can be reconnected to NAND circuits 201–208 so that the timer circuit 101 controls the time period during which the nozzles 21–24 extending from the first bowl 17 are dispensing fluid, and the timer circuit 102 controls the timed period during which the nozzles 25–28 extending from the second bowl 18 are dispensing fluid. For this mode of operation of the electronic control circuit 60, the lead 111 will be connected to the $b$ terminal of the NAND circuits 201–204 and the lead 112 will be connected to the $b$ terminal of NAND circuits 205–208. This mode of operation is preferred when it is desired to blend two products in each can with one product being dispensed from the first bowl 17 and the other product being dispensed from the second bowl 18.

Additionally, it is to be understood that the components of the electronic control circuit 60 can be duplicated and interconnected to provide an electronic control circuit for controlling the filling of cans in the two lines 19a and 20a from the two bowls 17 and 18 with single indexing or with double indexing. Also, it is to be understood that the power supply voltages are only limited by choice and availability of the circuit components. Thus, the operating voltages can be 110 or 220 volts AC and 5 or 12 volts DC Furthermore, the can sensing devices 51 and 52 and the carrier advancement sensing device 56 need not be limit switches and can be, for example, photocells or proximity switches.

From the foregoing description, it will be understood that the electronic control circuit 60 of the present invention provides a number of advantages, some of which have been described above and others of which are inherent in the invention. According, the scope of the invention is only to be limited as necessitated by the following claims.

I claim:

1. In a machine for filling containers with fluid, said machine including carrier means for carrying containers in a predetermined path, a plurality of container-filling stations located along said path including a first filling station and a second filling station, an individual nozzle situated at each of said filling stations and located above said carrier means for dispensing a predetermined amount of fluid into a container positioned at said filling station, fluid supply means for supplying fluid to said nozzles, individual metering means associated with each nozzle for metering the flow of fluid through each nozzle whereby each nozzle will dispense the same amount of fluid into any container positioned under said nozzle, individual electric control means for operating each of said metering means, and advancing means for intermittently advancing said carrier means a predetermined distance equal to the distance between said first and second filling stations and for indexing said containers with respect to the nozzles at said filling stations, the improvement comprising an electronic control circuit including means for sensing the presence of a container at said first filling station, means for sensing when said carrier means has been advanced said predetermined distance, means for causing actuation of the electric control means associated with the metering means at said first station to fill said container at said first filling station with said predetermined amount of fluid when the presence of a container at said first filling station is being sensed at the same time an advancement of said carrier means said predetermined distance is sensed, and means for causing sequential actuation of said succeeding electric control means at any succeeding filling station, each time said carrier means is advanced and said container is indexed with respect to a succeeding filling station without sensing the presence of said container at said succeeding filling station and only if said container had been sensed and filled at said first filling station, to fill said container with said predetermined amount of fluid at each of said succeeding filling stations.

2. A machine as defined in claim 1 wherein said means for sensing the presence of a container at said first filling station includes means for generating a first signal when said container is at said first filling station, said means for sensing when said carrier means has been advanced said predetermined distance to index containers with said filling stations includes means for generating an index signal when said carrier means has been so advanced and said container has been so indexed, and wherein said means for causing actuation of said first electric control means and said means for causing sequential actuation of said succeeding electric control means includes individual electronic switch means associated with each of said electric control means for energizing each of said electric control means, timer circuit means for controlling the period of operation of each of said electronic switch means, and signal memory means for receiving and storing said first signal and for receiving said index signals, said signal memory means including means for applying an output signal to said timer circuit means and to said first electronic switch means associated with said first metering means at said first filling station when said first signal and an index signal are received at the same time by said signal memory means to cause metering of said predetermined amount of fluid into said container at said first filling station and means for applying an output signal to said timer circuit means and to each succeeding electronic switch means upon receiving each successive index signal to cause successive meterings of said predetermined amount of fluid into said container at each succeeding filling station after said container has been advanced thereto.

3. A machine as defined in claim 1 wherein said means for causing actuation of said first electric control means and said means for causing sequential actuation of said succeeding electric control means are defined by a shift register circuit which is operated, when the presence of a container has been sensed at said first filling station at the same time that an advancement of said carrier means said predetermined distance has been sensed, to cause energization of said first electric control means for filling said container at said first filling station with said predetermined amount of fluid and which is successively operated, upon successive sensings of each advance of said carrier means said predetermined distance, to cause sequential energization of each of said electric control means at each of said filling stations to fill said container with said predetermined amount of fluid at each successive filling station without sensing the presence of said container at each successive filling station.

4. A machine as defined in claim 1 wherein each of said individual electric control means includes solenoid means for operating said metering means and a gate controlled electronic switch connected in series with said solenoid and a source of electric potential and having its gate connected with an individual output terminal of said electronic control circuit.

5. A machine as defined in claim 1 wherein said electronic control circuit includes a timer circuit for controlling the time period each electric control means is energized.

6. A machine as defined in claim 5 wherein said electronic control circuit includes an individual logic switching circuit associated with each electric control means and wherein said means for causing actuation of said first electric control means and said means for causing sequential actuation of said succeeding electric control means are defined by signal generating means for generating a signal which is applied to the first logic switching circuit associated with the first electric control means and to said timer circuit when the presence of said container at said first filling station and an advancement of said carrier means said predetermined distance have been sensed at the same time, and for thereafter applying a signal to said timer circuit and to successive logic switching circuits each time said carrier means is advanced to the next succeeding filling station without sensing the presence of said container at said succeeding filling stations, each one of said logic switching circuits being connected to one of said electric control means and being operative when it receives two signals, one from said signal generating and one from said timer circuit, to apply a signal to one of said electric control means to energize same to cause metering of said predetermined amount of fluid from one of said metering means, said electric control means being energized only during the time said signal from said timer circuit is being received by said logic switching circuit, and said electric control means being de-energized when said timer circuit terminates said signal.

7. A machine as defined in claim 5 wherein said means for causing actuation of said electric control means includes an individual logic switching circuit associated with each of said electric control means, each one of said logic switching circuits having an output terminal connected to one of said electric control means and first and second input terminals, said electronic control circuit including means for applying a signal to said first input terminal of said logic switching circuit associated with said first electric control means and to said timer circuit when the presence of a container has been sensed at said first filling station at the same time an advancement of said carrier means said predetermined distance has been sensed, said timer circuit including an output terminal which is connected to said second input terminal of each of said logic switching circuits and means for applying a signal to said second input terminals for a predetermined time period after receiving said signal from said signal applying means, each one of said logic switching circuit being adapted to apply an output signal to its associated electric control means to cause energization of same when signals are received at the same time at said first and second input terminals of said one logic switching circuit.

8. A machine as defined in claim 7 wherein said timer circuit includes a flip-flop circuit comprising first and second electronic switching elements each having an input terminal, an output terminal and a control terminal, said flip-flop circuit having a common conductor connected to the negative terminal of a source of operating voltage and a positive conductor connected to the positive terminal of said source, said signal applying means being connected to said control terminal of said first electronic switching element, said second electronic switching element normally being conductive whereby said input terminal thereof is normally at low potential, said input terminal of said second electronic switching element being connected to each of said second input terminals of each of said logic switching circuits so that, when a signal is applied to said control element of said first electronic switching element to render same conductive thereby rendering said second switching element nonconductive, the voltage potential at said input terminal of said second electronic switching element increases to essentially said operating voltage of said flip-flop circuit to establish the signal which is applied to said second input terminal of said logic switching circuits, a resistor and a capacitor connected in series between said input terminal of said second electronic switching element and said common conductor, and a third electronic switching element having a control terminal connected to the junction between said resistor and said capacitor and having an input terminal and an output terminal, said output terminal being connected to said control terminal of said second switching element whereby, after said capacitor has charged to a predetermined voltage, said third switching element is rendered conductive to apply a signal to said control terminal of said second electronic switching elements as to render said second electronic switching element conductive thereby reducing the voltage at said input terminal of said second electronic switching element to essentially ground potential and in this way, terminating at the end of said predetermined time period, the signal applied from said input terminal of said second electronic switching element to said second input terminals of said logic switching circuits.

9. A machine as defined in claim 8 wherein said third electronic switching element is a unijunction transistor and one base terminal thereof constitutes said control terminal.

10. A machine as defined in claim 8 including a fourth electronic switching element and a second resistor which are connected in series, between said common conductor and the junction of said capacitor, said first mentioned resistor and said control terminal of said third switching element, to form a shunting circuit for said capacitor, the control terminal of said fourth electronic switching element being connected to said input terminal of said first electronic switching element whereby when said third electronic switching element is rendered conductive so as to render said second electronic switching element conductive said first switching element is rendered non-conductive and the voltage potential at said input terminal of said first switching element is increased to a sufficient level to turn on said fourth switching element to render the same conductive thereby actuating said shunting circuit to shunt said capacitor through said second resistor and said fourth electronic switching element whereby the charge on said capacitor is quickly and completely dissipated to ensure accurate repeatability of the predetermined time period of said timed signal when said capacitor is again charged.

11. A machine as defined in claim 8 wherein said timer circuit includes a buffer circuit comprising a further electronic switching element having an input terminal, an output terminal and a control terminal, and a reactive signal channel connecting the output terminal of said further electronic switching element with said control terminal of said first electronic switching element of said flip-flop circuit, said signal from said signal applying means being applied to said control terminal of said further electronic switching element and being a varying voltage pulse the positive going edge of which renders said further electronic switching element conductive to apply a trigger pulse through said reactive signal channel to said control terminal of said first switching element to render same conductive and initiate operation of said timer circuit.

12. A machine as defined in claim 1 wherein said electronic control circuit includes machine control means which is connected to said means for advancing said carrier means and to said electronic control means for preventing operation of said advancing means while any one of said electric control means is energized and fluid is being dispensed through one of said nozzles.

13. A machine as defined in claim 1 wherein said means for sensing the presence of a container at said first filling station includes a two position limit switch and a flip-flop buffer circuit, said limit switch being connected to said flip-flop buffer circuit in such a way that when it is moved from a first position to a second position by a container engaging said limit switch, said flip-flop buffer circuit is caused to apply a signal to said means for actuating said first electric control means at said first filling station.

14. A machine as defined in claim 1 wherein said means for sensing when said carrier means has been advanced a distance equal to said predetermined distance includes a two position limit switch operatively associated with movements of said carrier means and cam means for actuating said limit switch each time said carrier means is advanced said predetermined distance, and wherein a flip-flop buffer circuit is connected to said limit switch and to said means for causing actuation of said first electric control means in such a way that, when said limit switch is moved from a first position to a second position and then back to said first position, said flip-flop buffer circuit is operated to apply a signal to said means for causing actuation of said electric control means.

15. A machine as defined in claim 1 in which said means for supplying fluid to said nozzles includes at least one fluid supply bowl, a portion of said plurality of nozzles, including said first and second nozzles, being connected to and extending from said one fluid supply bowl, and said electronic control circuit includes timer means for controlling the time period during which each of said electric control means for each of said metering devices for each of said nozzles extending from said one fluid supply bowl is energized, said timer means being connected to said means for causing actuation of said electric control means.

16. In a machine for filling containers with fluid, said machine including carrier means for carrying containers in a predetermined path, a plurality of odd and even numbered container filling stations located along said path and including a first filling station, a second filling station, a third filling station and a fourth filling station, an individual nozzle situated at each of said filling stations and located above said carrier means for dispensing a predetermined incremental amount of fluid into a container positioned at said filling station, fluid supply means for supplying fluid to said nozzles, individual metering means associated with each nozzle for metering the flow of fluid through each nozzle whereby each nozzle will dispense the same amount of fluid into any container positioned thereunder, individual electric control means for operating each of said metering means, and advancing means for intermittently advancing said carrier means a predetermined distance equal to the distance between said first and third filling stations and for indexing containers on said carrier means with respect to the nozzles at said filling stations, the improvement comprising an electronic control circuit including means for sensing when a first container is at said first filling station, means for sensing when said carrier means has been advanced said predetermined distance, means for actuating said first electric control means to fill said first container at said first filling station with said predetermined amount of fluid when the presence of said first container at said first station and an advancement of said carrier means said predetermined distance have been sensed at the same time, means for causing sequential actuation of said succeeding electrical control means at said succeeding odd numbered filling stations each time said carrying means is advanced said predetermined distance without sensing the presence of said first container at said succeeding odd numbered filling stations and only if said first container had been sensed and filled at said first filling station, means for sensing the presence of a second container at said second filling station, means for causing actuation of said second electric control means to fill said second container at said second filling station with said predetermined incremental amount of fluid when the presence of said second container at said second filling station and an advancement of said carrier means said predetermined distance have been sensed at the same time, and means for causing sequential actuation of succeeding electric control means at succeeding even numbered filling stations each time said carrier means is advanced said predetermined distance without sensing the presence of said container at said succeeding even numbered filling stations and only if said second container had been sensed and filled at said second filling station.

* * * * *